US007979551B2

(12) United States Patent  (10) Patent No.: US 7,979,551 B2
Ingle et al.  (45) Date of Patent: Jul. 12, 2011

(54) ENHANCING AVAILABILITY OF REMOTE APPLICATIONS

(75) Inventors: Anil Ingle, Woodinville, WA (US); Ben Newman, Seattle, WA (US); Jose Bernabeu-Auban, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 207 days.

(21) Appl. No.: 12/365,679

(22) Filed: Feb. 4, 2009

(65) Prior Publication Data

US 2010/0198970 A1 Aug. 5, 2010

(51) Int. Cl.
 *G06F 15/173* (2006.01)
(52) U.S. Cl. ........ 709/226; 709/238; 709/239; 709/240; 709/219; 714/26; 714/39; 707/103; 707/204
(58) Field of Classification Search .................. 709/226, 709/238–240, 219; 714/26, 39; 707/103, 707/204
See application file for complete search history.

(56) References Cited

U.S. PATENT DOCUMENTS

| 6,594,279 | B1 | 7/2003 | Nguyen et al. | |
| 7,200,530 | B2 | 4/2007 | Brown et al. | |
| 7,231,550 | B1 * | 6/2007 | McGuire et al. | 714/26 |
| 7,437,459 | B2 | 10/2008 | Chidambaran et al. | |
| 7,603,529 | B1 * | 10/2009 | MacHardy et al. | 711/162 |
| 2004/0267897 | A1 | 12/2004 | Hill et al. | |
| 2006/0173994 | A1 | 8/2006 | Emeis et al. | |
| 2006/0200494 | A1 | 9/2006 | Sparks | |
| 2008/0126404 | A1 * | 5/2008 | Slik et al. | 707/103 R |

OTHER PUBLICATIONS

Mohammad Muztaba Fuad; An Autonomic Software Architecture for Distributed Applications; Journal of Dissertation, vol. 1, Issue 1, Jun. 2007; http://www.scientificjournals.org/journals2007/articles/1198.pdf, 191 pps.
Qin Yin, Justin Cappos, Andrew Baumann and Timothy Roscoe; Dependable Self-Hosting Distributed Systems using Constraints;http://www.usenix.org/event/hotdep08/tech/full_papers/yin/yin_html/, pp. 1-10.
Oscar Ardaiz Villanueva and Joe Touch; Web Service Deployment and Management using the X-Bone; http://www.isi.edu/touch/pubs/seid2000.pdf, 12 pps.
Debzani Deb, M. Muztaba Fuad and Michael J. Oudshoorn; ADE: Utility Driven Self-Management in a Networked Environment; Journal of Computers, vol. 2, No. 9, Nov. 2007; http://www.academypublisher.com/jcp/vol02/no09/jcp02090715.pdf, 9 pps.
Nonprovisional Patent Application entitled "Replica Placement in a Distributed Storage System,"; U.S. Appl. No. 12/258,045, filed Oct. 24, 2008, pp. 1-29.

* cited by examiner

*Primary Examiner* — Wing F Chan
*Assistant Examiner* — Benjamin M Thieu
(74) *Attorney, Agent, or Firm* — Shook, Hardy & Bacon L.L.P.

(57) ABSTRACT

Systems, products, and methods are disclosed for performing a method of allocating services (functionalities of software applications) across several computing devices that make up various domains of a data center so that the functional aspects will continue to be available to remote users even when, from time to time, different sets of computing devices are unavailable.

16 Claims, 13 Drawing Sheets

ENHANCING AVAILABILITY OF REMOTE APPLICATIONS

SUMMARY

Embodiments of the invention are defined by the claims below, not this summary. A high-level overview of various aspects of the invention are provided here, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, a way to increase the likelihood that a software application is remotely available by strategically allocating computing devices to services (and/or vice versa). Services are collections of programs that make up an application that a user might want to use. Data centers house many tens, hundreds, or more computers. To the extent these computers are grouped together (into "domains"), we describe ways of allocating the services across the various domains so that the services are available even when certain of the computer groupings are not available (because they are being upgraded or enter into a fail/fault state for example).

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

The subject matter of the present invention is described with specificity herein to meet statutory requirements. However, the description itself is not intended to necessarily limit the scope of the claims. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a node (computing device), and various other devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

As briefly mentioned, one way that our technology helps increase the likelihood that applications will be available to remote users is to strategically allocate services across computing devices that make up a data center. When we speak of a "service," we are generally referring to a collection of programs that makes up an application that a user desires to run. Today, applications that have historically been locally run are now being made available remotely. Thus, illustrative examples of services include web sites, productivity suites, word-processing applications, spreadsheeting applications, and the like. We provide a few illustrative examples and by no means intend to insinuate that the aforementioned list is exhaustive.

In some cases, a service might be made up of individual application components. For example, consider a robust website. Such a website might include a front end, a billing component, and perhaps an indexing or data-management component for example. Collectively, these individual application components make up a service in one embodiment. Moreover, it might be the case that each component is made up of several applications and maybe even several tens or hundreds of applications. For example, several hundred applications might be necessary to present the various user interfaces associated with the front end of a website. Similarly, several applications might be necessary to facilitate the functionality associated with indexing and managing the data and billing data associated with a given website.

As also briefly mentioned, an exemplary problem that is associated with a data center includes an ability to perform maintenance on various computers that make up the data center without interrupting the services that are provided by the data center, which might be made up of several tens or hundreds of computers. These computers can be allocated across services according to technology that we describe so as to increase a likelihood that the service will be available to a user who desires to use it.

Consider for example, a sophisticated website that is responsible for carrying out a great deal of e-commerce. Such a website presents visual components to a user such that when a user visits the website, she can see the various items that are available for sale, trade, etc. And it might be the case that several thousand or million people attempt to access the website at the same time. To accommodate so many people hitting such a website during a period of time, several instances of the website will be distributed across many different computers of the data center. Aspects of our technology relate to how best to distribute the various instances of a service (or program component thereof) across the various computing devices of the data center.

Figure 1:
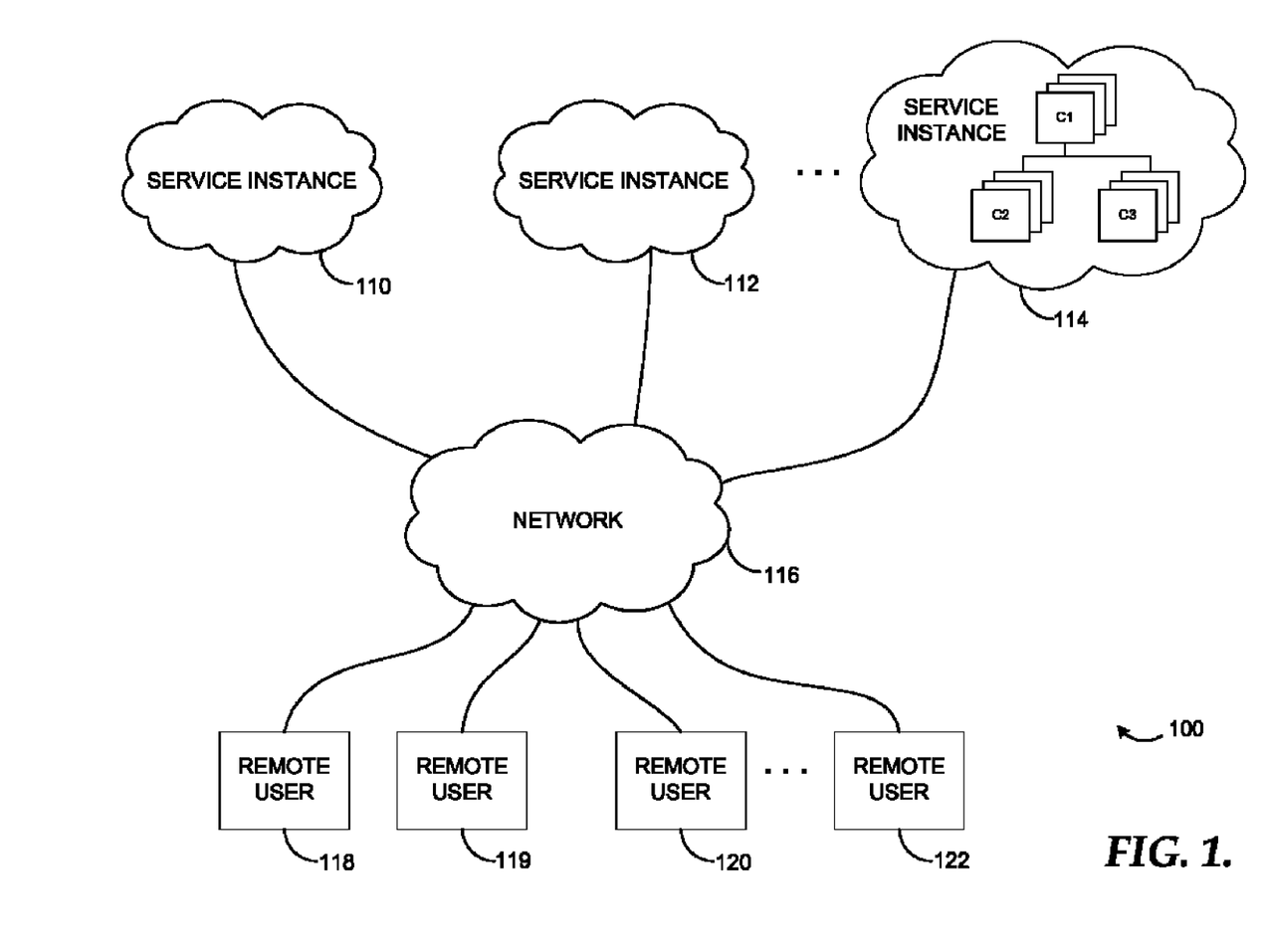
FIG. 1 depicts an illustrative operating environment suitable for practicing an embodiment of the present invention.

Turning now to FIG. 1, an illustrative operating environment suitable for practicing an embodiment of the present invention is provided generally, and is referenced by the numeral 100, which includes a first service instance 110, a second service instance 112, and a third service instance 114. In one operating environment, the service instances are run on computers located in a data center. We only show three examples of service instances, but there may actually be several hundred, thousand, or more. By way of example, we indicate that service instance 114 might be composed of constituent application components, which are designated as "C1," "C2," "C3."

The various service instances are made available by way of a network 116 (which might actually be multiple networks) to various remote users, which we illustratively show as boxes 118, 119, 120, and 122. Thus, as mentioned, one of the remote users might wish to utilize one of the services shown.

Figure 2:
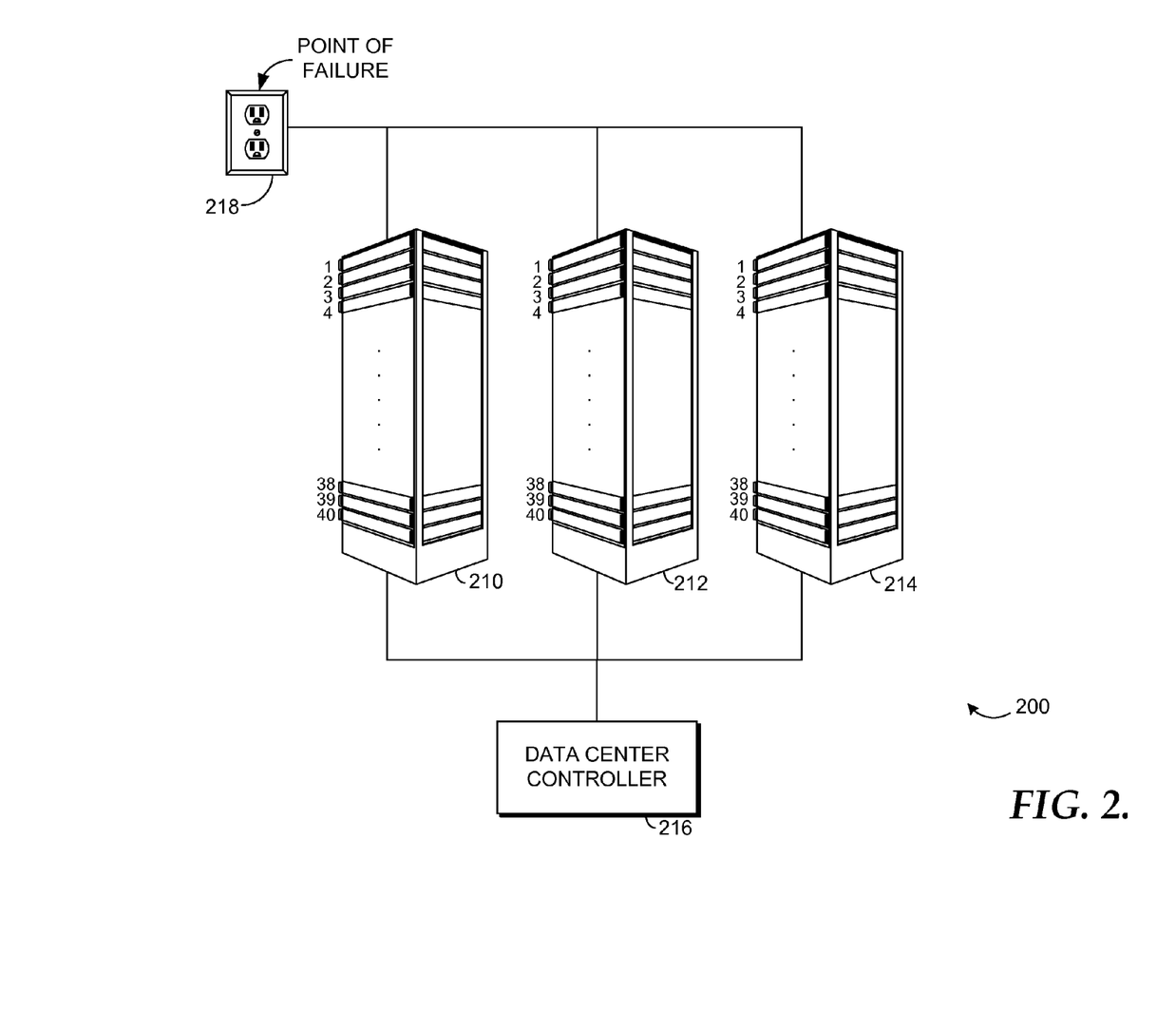
FIG. 2 depicts an illustrative data center.

Turning now to FIG. 2, a high-level block diagram is provided and referenced generally by the numeral 200. Data center 200 includes, in some examples, sets of racks of computers. By way of illustration, a first rack 210, a second rack 212, and a third rack 214 are shown. These various computers are controlled by a data-center controller 216, which manages various aspects of the computers that are in the various racks. Different racks vary, but in the example shown, each rack includes an ability to hold a set of computers, which set might include forty for example. We illustratively show each rack as holding forty computing devices. Those of ordinary skill in the art often refer to "slots." That is, a computer is generally referred to as occupying a slot. A slot can be various heights. These various heights are often referred to as "1U," "2U," etc. A 1U computing device occupies one slot of a rack. Sometimes, each rack is powered by a common source. Here, we show three racks being powered by a common power source 218, which need not necessarily be an electrical outlet but might be a power panel. We indicate power source 218 as an illustrative point of failure.

When we speak of a "point of failure," we are generally referring to a thing that, if it enters into a failed state, results in other items that it is either controlling or powering entering into a failed/fault state as well. For example, if power source 218 were compromised, then racks 210, 212, and 214 would enter into a fail state.

Other points of failure might also be associated with the various computing devices. For example, and with reference to FIG. 3, a first network switch in "slot 0" becomes a point of failure to 1-18. A network switch is a computer-networking component that helps direct traffic to various computing devices. To the extent that a set of computing devices relies on communicating data by way of a common network switch, if that network switch enters into a fail state, then the various computing devices that it is coupled to also will enter into a fail state because they will no longer be a able to send or receive data. Sometimes, such a switch is referred to as a "top of rack" switch when the network switch occupies the first slot of a rack, which we make reference to by reference number 310.

Figure 3:
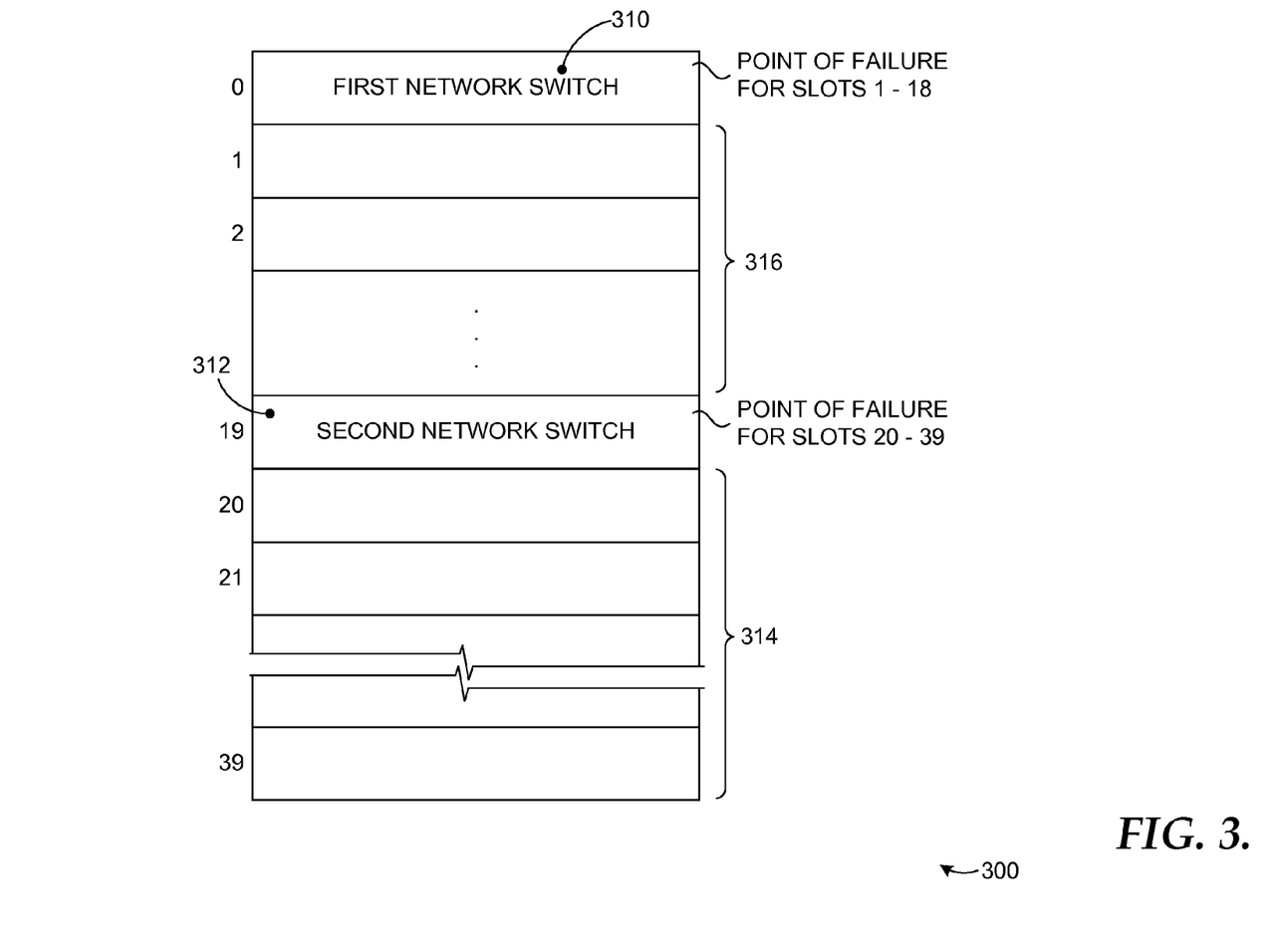
FIG. 3 is a schematic diagram of an illustrative rack.

Groups of computers in a common rack are commonly controlled by a single switch, the aforementioned top-of-rack switch. And as mentioned, if this were the case, then the top-of-rack switch would serve as a point of failure for all computing devices in the rack; for example, all forty computing devices if a rack held that many. This would define a fault domain. As used herein, a "domain," is a group of computing devices. Similarly, a fault domain is a group of computing devices that are commonly subject to a common point of failure, such if the common point of failure entered into a fail state, then the given set of computing devices fail to function. If a rack of computers is serviced by (connected to) a single network switch, then the network switch operates a single point of failure, and all of the computing devices of the rack would be members of a certain fault domain.

But it might also be the case that a single rack houses multiple switches. Such a scenario might include multiple fault domains. For example, and with continuing reference to FIG. 3, perhaps a second network switch 312 services a second set of computing devices 314. In this example, two fault domains would exist; a first set of computing devices 316 as well as a second set 314.

Another type of domain that we will make reference to is an update domain. As used herein, the term "update domain" includes a group of computing devices that are unavailable while being subjected to an update process. This update process might take on various forms of maintenance. For example, perhaps software on a computing device needs to be modified. In other cases, hardware items of one or more computing devices might need to be modified. In any case, computing devices of a given update domain are devices that would be commonly unavailable from time to time. That is, computing devices of an update domain would become unavailable from time to time for various reasons. As the computing devices in the update domain are being subject to an update process, users would not be able to utilize the functional aspects exposed by those computing devices.

Figure 4:
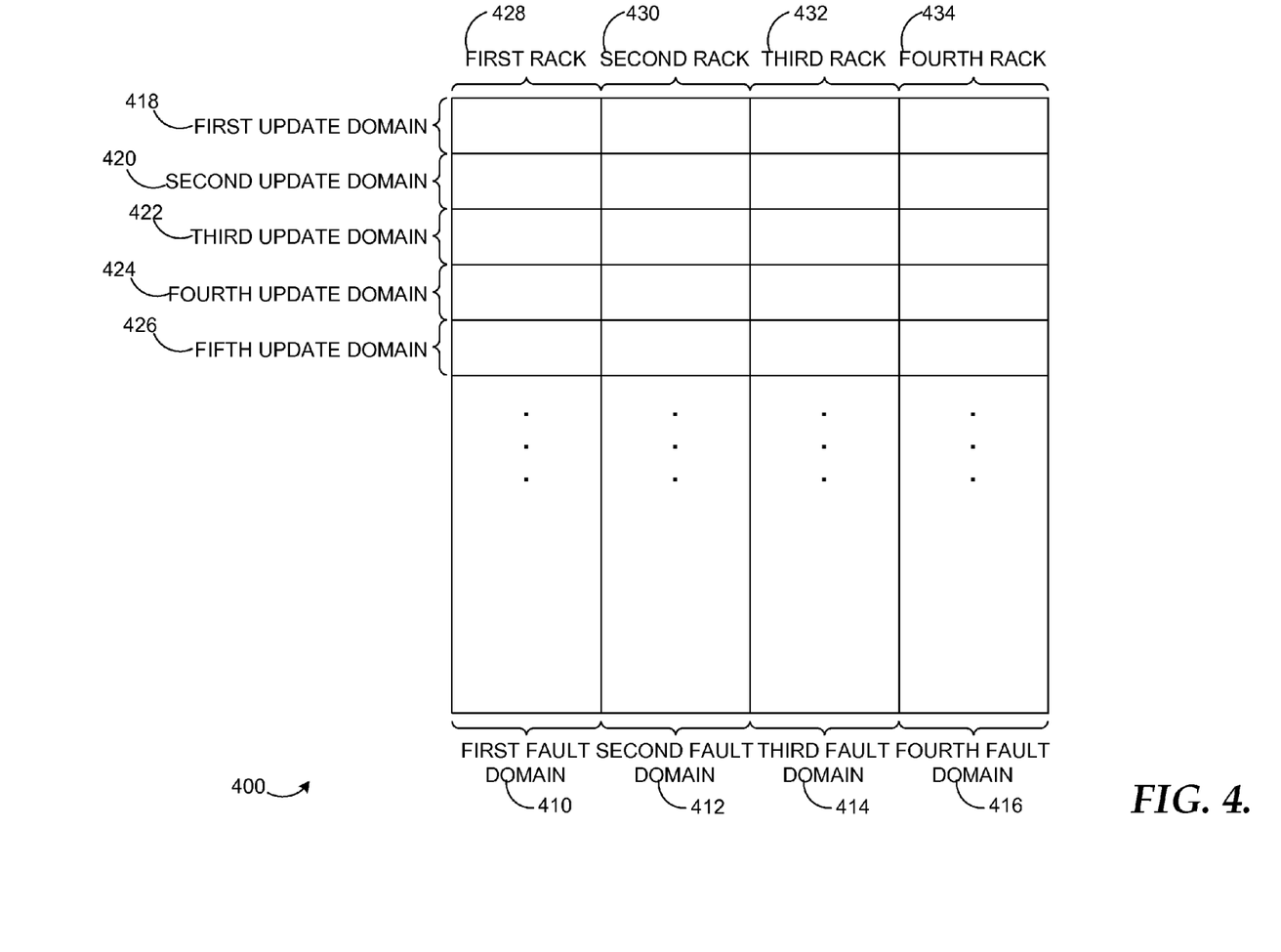
FIG. 4 illustrates an arrangement of fault domains and update domains according to an embodiment of the present invention.

Turning now to FIG. 4, a schematic representation of various update domains and fault domains are provided in an illustration that is referenced by numeral 400, which shows a first fault domain 410, a second fault domain 412, a third fault domain 414, and a fourth fault domain 416. A data center might include several hundreds or thousands of fault domains, and some of which might not be part of racks as we illustratively show. That is, we do not mean to imply that the only way that a set of computing devices to be part of a fault domain is for them to be part of a common rack.

Illustration 400 also shows a first update domain 418, a second update domain 420, a third update domain 422, a fourth update domain 424, and a fifth update domain 426. Several more update domains might also be associated with illustration 400; but we show five by way of example. As briefly alluded to, each fault domain is respectively associated with a rack, including a first rack 428, a second rack 430, a third rack 432, and a fourth rack 434. There does not need to be a one-to-one correspondence between a rack and a fault domain. Perhaps a single rack includes multiple fault domains. We show a 1:1 correspondence to help keep simple explaining embodiments of the present invention. A fault domain might be defined by a set of computing devices that share a common power source, switch, or any other entity that might cause the computers to commonly fault.

Figure 5:
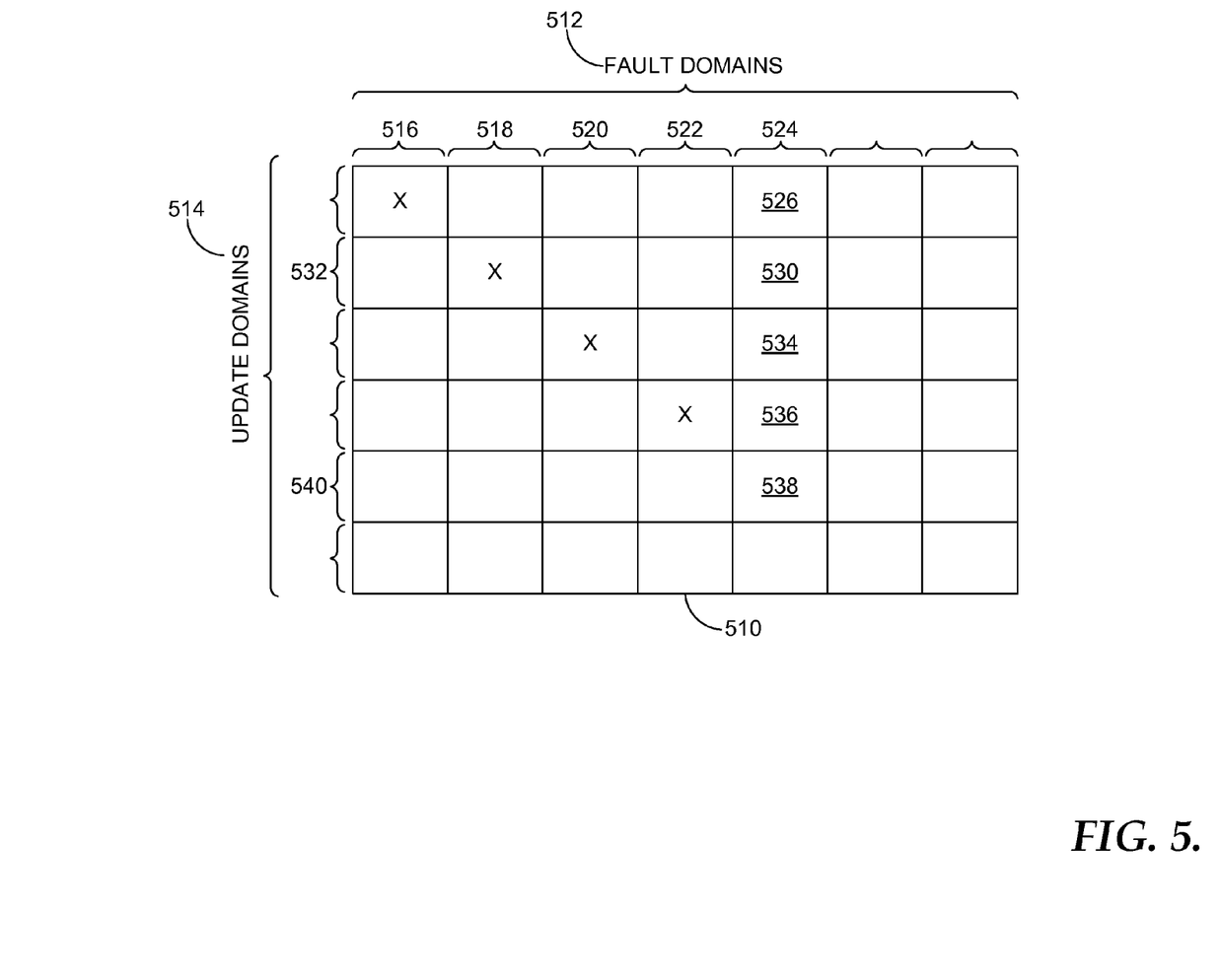
FIG. 5 depicts a higher-level illustration of fault domains and update domains according to an embodiment of the present invention.

The illustration of FIG. 4 could be further abstracted into a grid format, which we show in FIG. 5. FIG. 5 depicts a grid 510 that includes a set of fault domains 512 as well as a set of update domains 514. Thus, rows of grid 510 represent update domains while the columns of grid 510 represent fault domains. Embodiments of our technology will describe how to allocate services across the various fault domains 512 and update domains 514. We indicate an instance by an "X."

Figure 6:
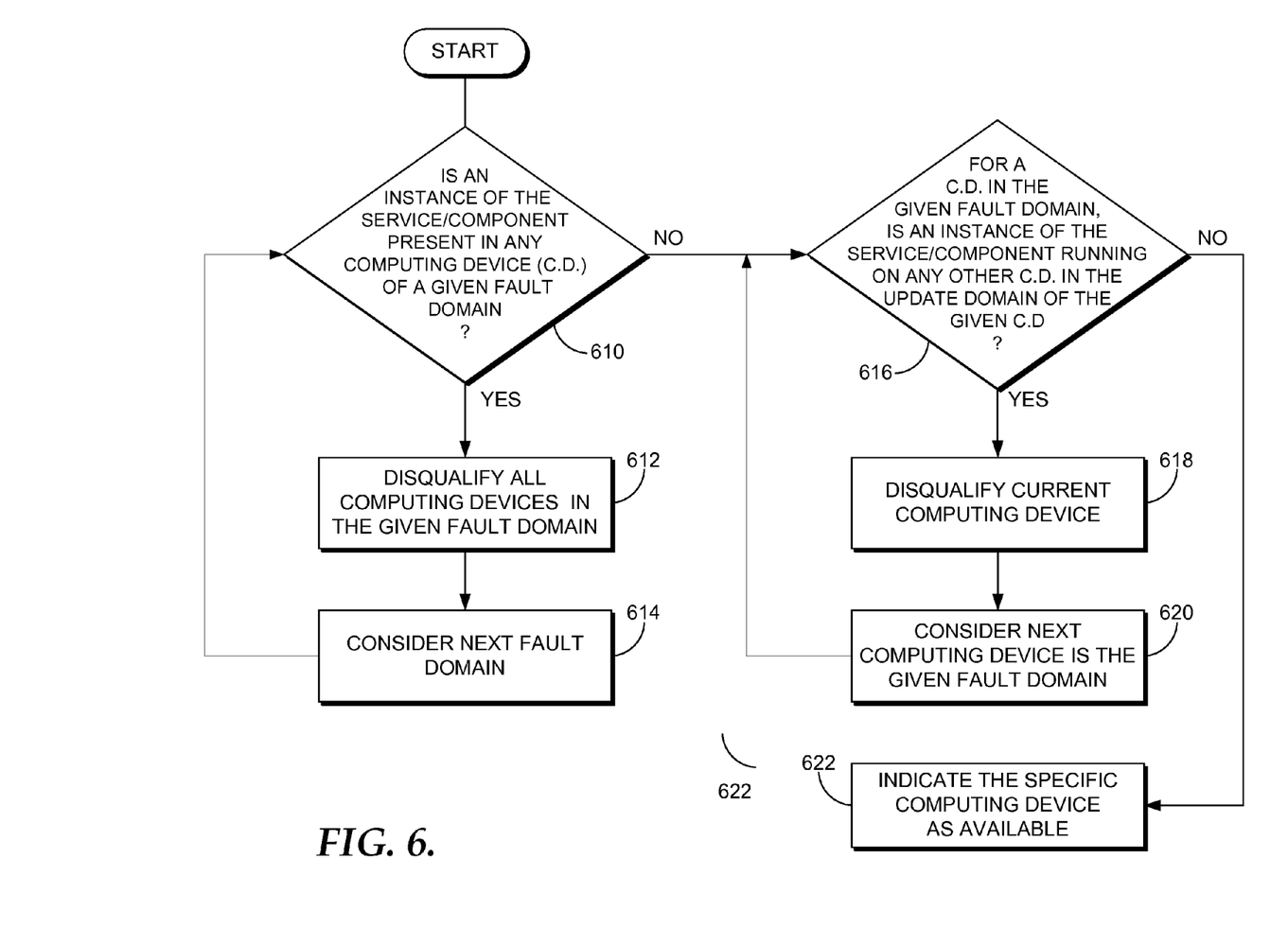
FIG. 6 depicts a first illustrative method for allocating a set of instances of a service across a set of domains according to an embodiment of the present invention.

An illustrative method for allocating a set of services across a set of domains is provided in FIG. 6, and is referenced by numeral 600. Flowchart 600 depicts merely one embodiment of our technology. In one embodiment, method 600 is practiced by data-center controller 216, which is sometimes called a fabric controller, but can be a computing device that controls a data center. Starting with some fault domain, at a step 610, a determination is made as to whether an instance of a service (or component) is present in any computing device of a given fault domain. We will make reference to FIG. 5 in connection with describing the flow of FIG. 6 to explain an embodiment.

If fault domain 516 were the relevant fault domain, then by way of step 610, a determination would be made as to whether an instance of the service was present in any computing device of fault domain 516. In the example of FIG. 5, such an instance does exist. Thus, because an instance of the service does exist in the given fault domain (516), all computing devices in the given fault domain are disqualified at a step 612. Another way of saying this is that fault domain 516 itself is deemed to be an unavailable fault domain to which an instance of a desired service might have otherwise been allocated.

At a step 614, a next fault domain is considered. By way of example, perhaps a fault domain 518 is considered. But because a computing device in fault domain 518 also includes an instance of the service (indicated by the "X" in the second row and second column), fault domain 518 would also be unavailable to receive an allocation of the desired service. This would be true of fault domains 520 and 522.

When considering fault domain 524, however, the question of step 610 would be answered in the negative, advancing processing to a step 616, in which a determination is made as to a given computing device in a given fault domain as to whether an instance of the service (or program component) is running on any other computing device in the update domain of the given computing device.

For example, consider cell 526 (computing device 526). Step 616 asks whether computing device 526 is in an update domain that includes an instance of the service. Here, it is; namely, computing device 526 is a member of update domain 528. That being the case, it is disqualified at a step 618 from being an available computing device upon which to run the desired service.

The next computing device of the available fault domain is considered at a step 620. That is, computing device 530, being a member of fault domain 524, is evaluated for availability at a step 616. But because computing device 530 is a member of update domain 532, which already includes an instance of the service, it is disqualified at a step 618. This would also be the case for computing devices 534 and 536. But when computing device 538 is considered by step 616, the determination would be answered in the negative because computing device 538 is not a member of an update domain that includes an instance of the service. Namely, update domain 540 currently does not include an instance of the relevant service. This being the case, the specific computing device is indicated as being available at a step 622. According to an embodiment of our invention, no service (or, depending on the case, service component, sometimes referred to as a "service role" or "role instance") can be allocated to a fault domain if another instance of the service is in that fault domain, and cannot be allocated to an update domain if that update domain includes any other instances of that service. Another way of stating this is to say that a computing device (sometimes referred to as node) cannot be allocated to a fault domain that includes another instance of a given service; nor can it be allocated to an update domain that includes another instance of the service.

Figure 7:
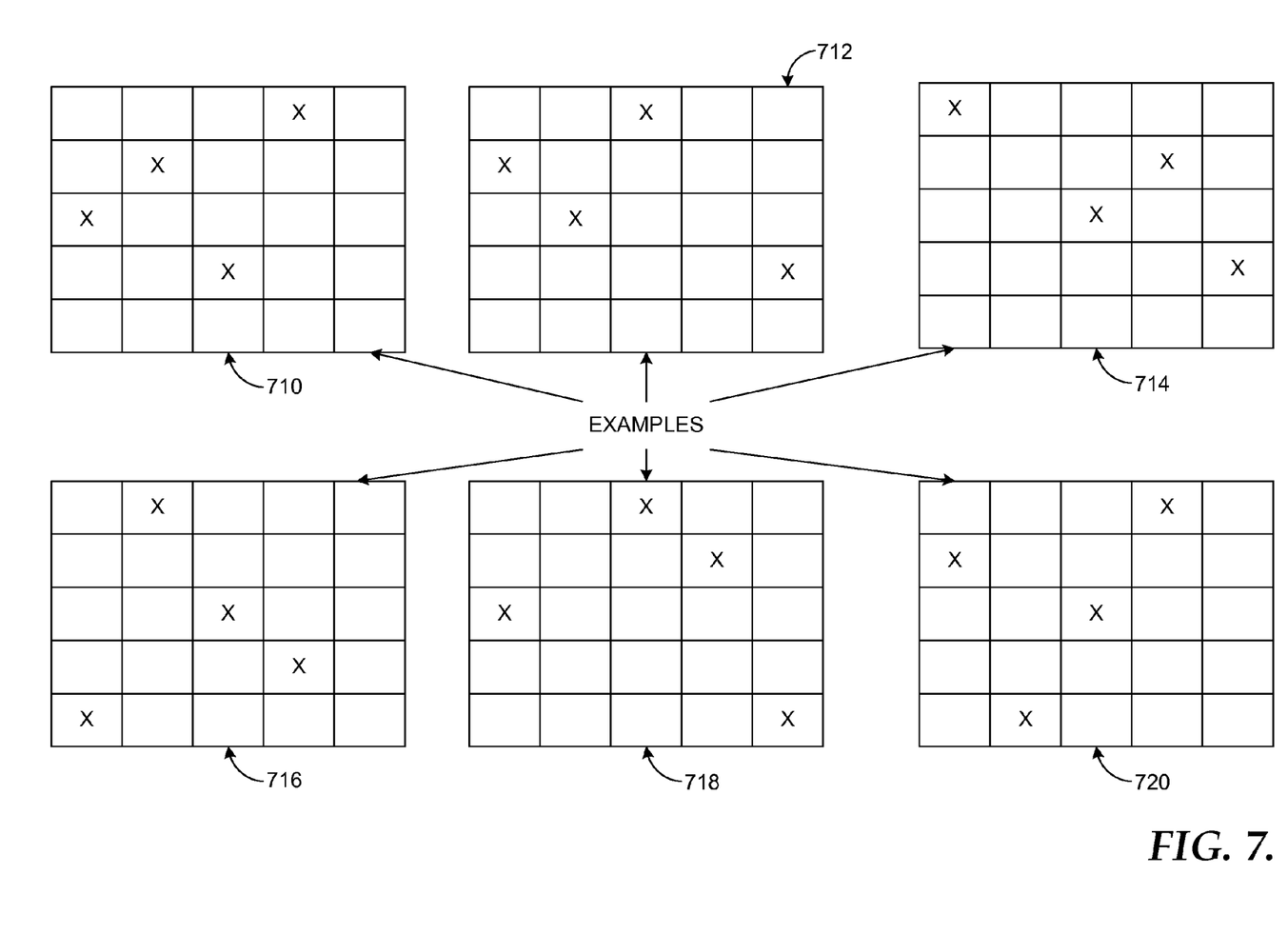
FIG. 7 depicts illustrative diagrams that convey illustrative arrangements of service allocations across first groups of computing devices and second groups of computing devices according to an embodiment of the present invention.

Turning now to FIG. 7, various results of the algorithm are pictorially presented. Six illustrative allocations are shown, referenced by numerals 710, 712, 714, 716, 718, and 720. As is illustrated in the examples 710-720, each fault domain includes at most a single instance of the service; and each update domain includes at most a single instance of the service as well (where fault domains are represented as columns, and update domains are represented as rows).

Figure 8:
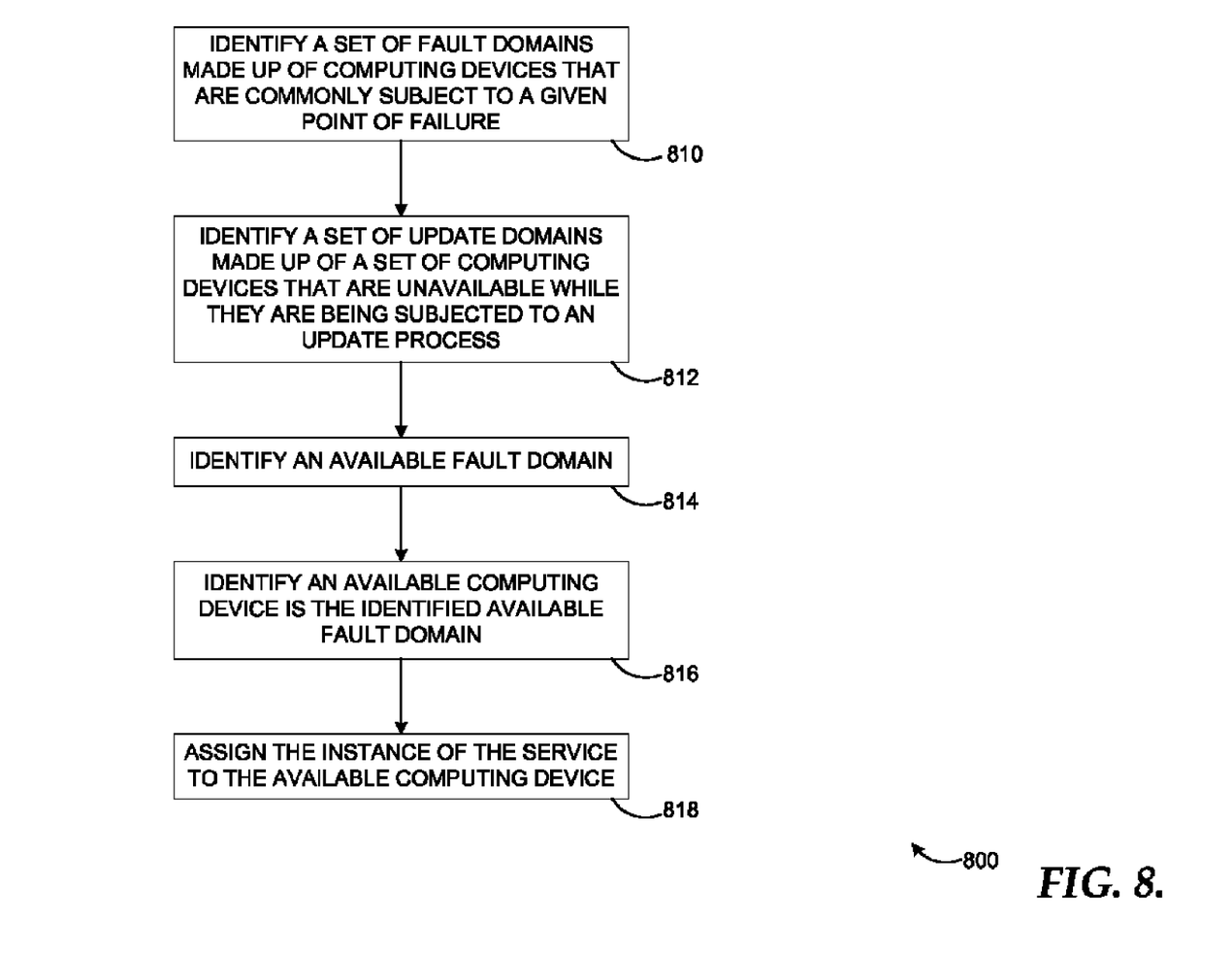
FIG. 8 depicts a second illustrative diagram of allocating service instances in a data center according to an embodiment of the present invention.

We will now describe another illustrative embodiment for allocating various instances of a service across various domains with reference to FIG. 8. At a step 810, a set of fault domains are identified. In one embodiment, each of the fault domains includes a given set of computing devices that are commonly subject to a given point of failure, such that if the given point of failure entered into a fail state, then the given set of computing devices would fail to function. At a step 812, a given set of update domains is identified. Each update domain includes a specific set of computing devices that are unavailable while they are being subjected to an update process. In some embodiments, steps 810 and 812 are preprocessing steps that have occurred prior to other steps. It might be the case that each identifying step is accomplished by referencing a data store that stores an indication of the fault domains and update domains.

At a step 814, data-center controller 216 by way of a set of computer-executable instructions begins to consider the various fault domains in search of an available fault domain. In one embodiment, this includes considering each fault domain in the set of fault domain sidentified in step 810 until a given fault domain is identified that does not include computing device that is running an instance of the service to be allocated. This results in determining an identified available fault domain.

At a step 816, a specific computing device within the identified available fault domain is identified. In one embodiment, this is accomplished by considering each computing device in the available fault domain of step 814 until a specific computing device is identified that is not a member of an update domain that is hosting an instance of the service to be allocated. This results in determining an available computing device that is available to host an instance of the service, which is assigned at a step 818 to the available computing device. This enables the specific computing device to begin hosting an instance of the service or component as the case may be.

Figure 9:
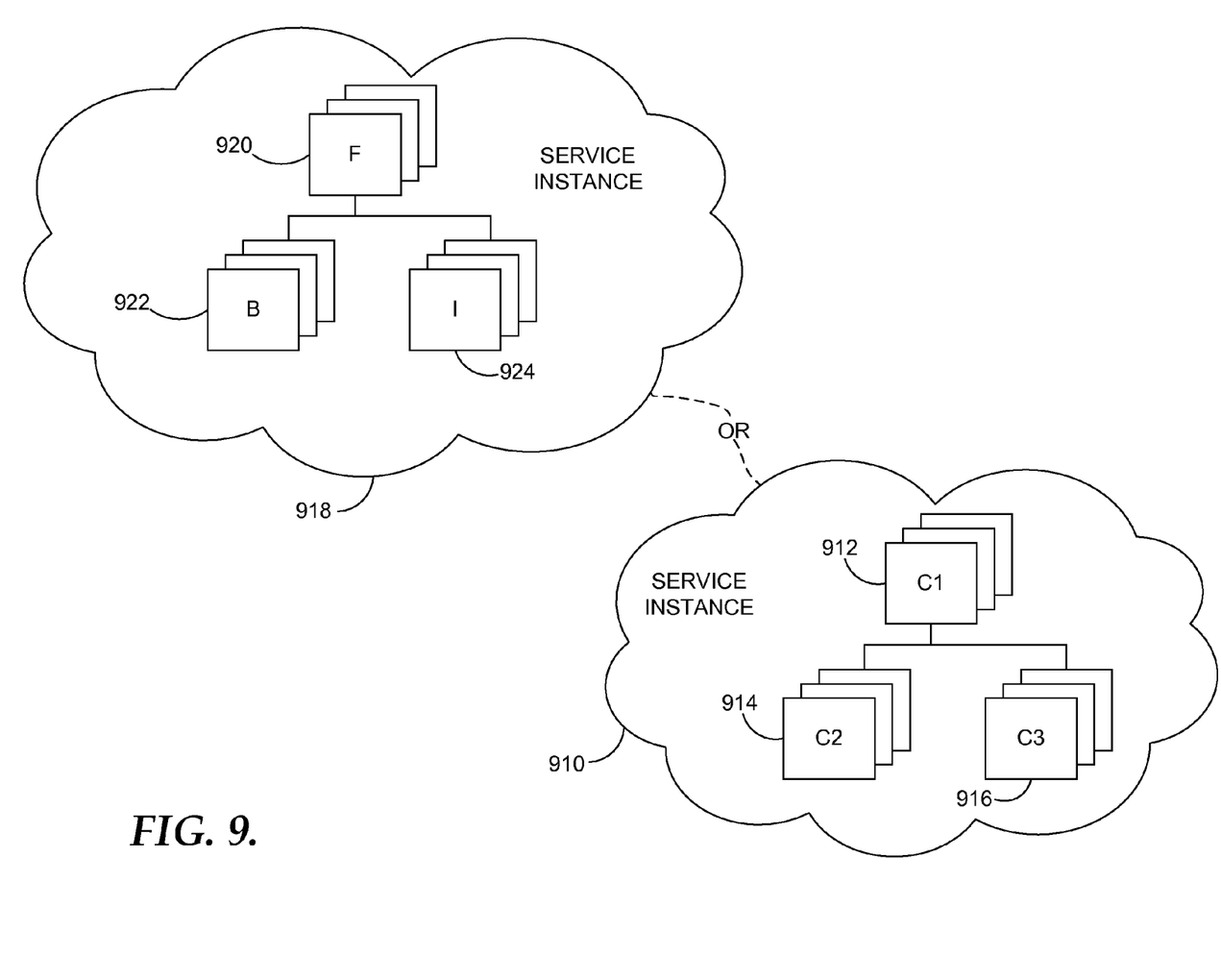
FIG. 9 depicts illustrative examples or services that include multiple application components.

Turning further attention to the scenario where the service is made up of multiple application components, we make reference to FIG. 9, which shows a high-level service instance 910 that includes an illustrative first component 912, a second component 914, and a third application component 916. Each of these components may be made up of multiple applications. A specific example of a service instance is provided and referenced by numeral 918. Service instance 918 includes a front end 920, a billing component 922, and an indexing component 924. Front-end component 920, billing component 922, and indexing component 924 are illustrative in nature. A service might include many more components, and possibly none of the ones that we show by way of illustration. We will now describe an illustrative method for allocating a service, such as service 918, across a set of computing devices of a data center that have been grouped in fault and update domains. To do so, we will make reference to FIG. 10, a flowchart, as well as FIG. 11, which includes grids 1110, 1112, 1114, and 1116, which help explain various aspects of an embodiment.

Figure 11:
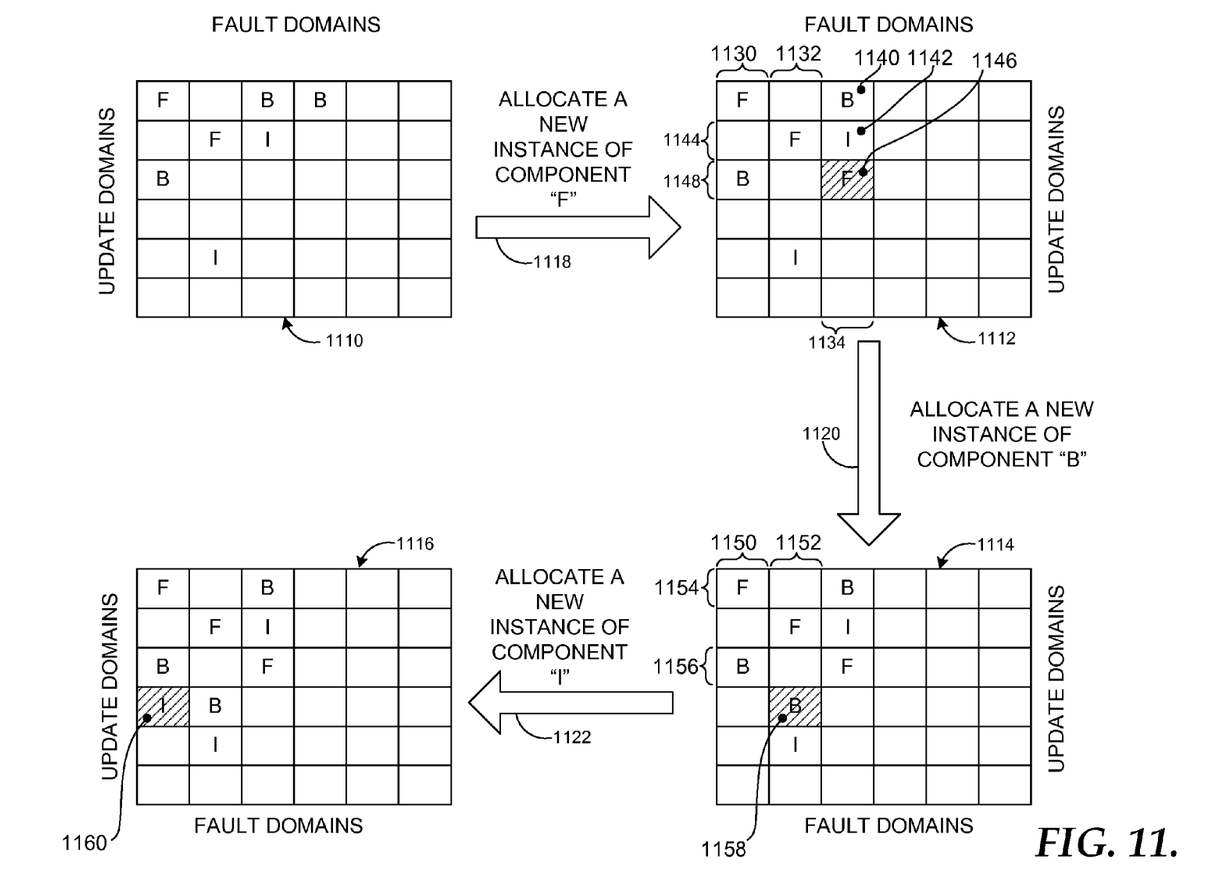
FIG. 11 provides schematic representations of service allocations according to an embodiment of the present invention.

In the example of FIG. 11, it is presumed that a first task 1118 will include allocating a new instance of the front end, which is indicated by an "F." Afterwards, we will further the illustration by allocating at a step 1120 a new "B" instance, and also an "I" instance at a step 1122.

Figure 10:
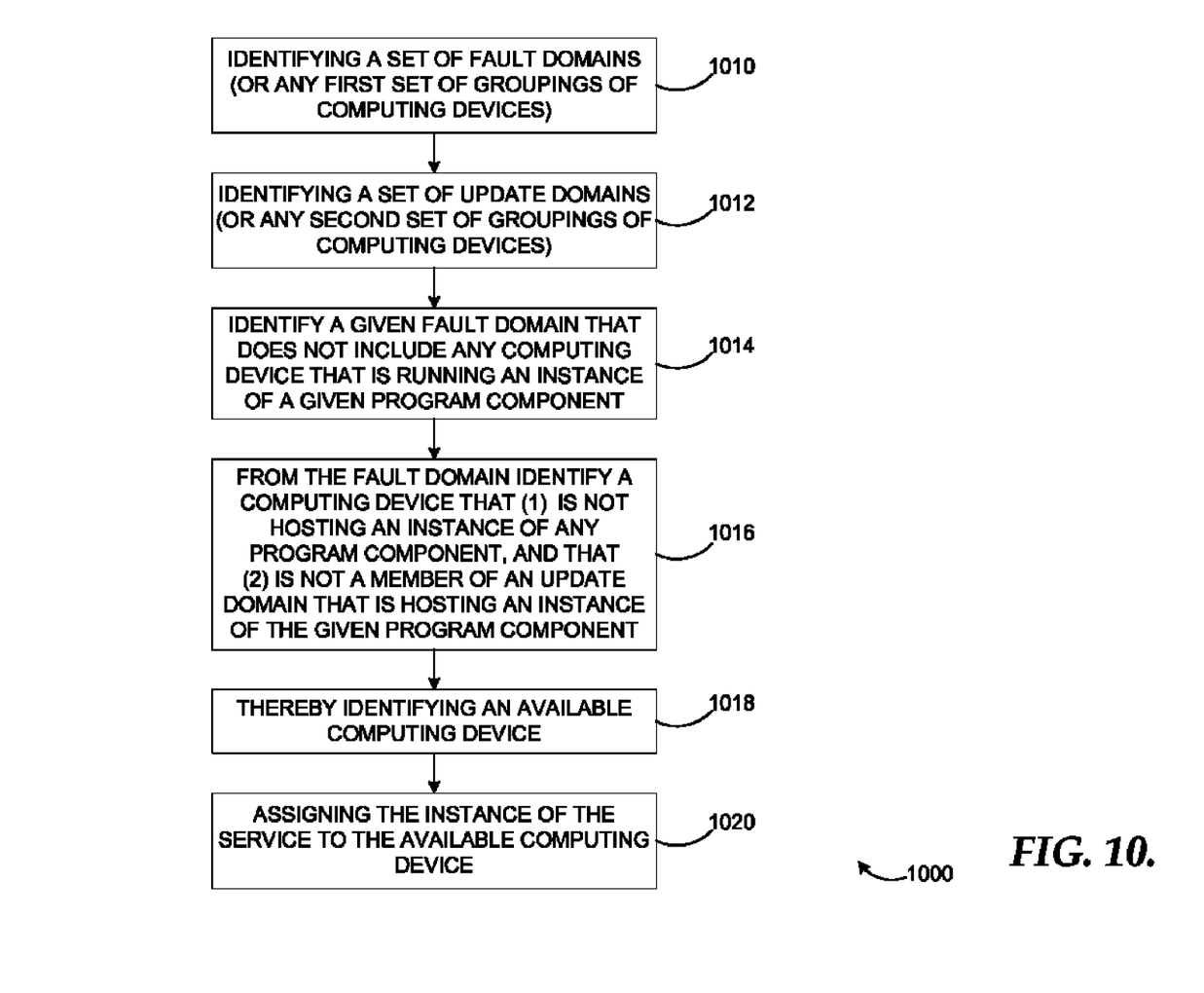
FIG. 10 depicts a third illustrative method for allocating services according to an embodiment of the present invention.

Turning now to FIG. 10, steps 1010 and 1012 are similar to steps 810 and 812 in that update domains and fault domains are identified. At a step 1014, an available fault domain is identified by considering each fault domain until one is identified that does not include any computing device that is running an instance of a given program component. If this happens, then it will result in identifying an available fault domain. Presuming that the status of a call center began as shown in grid 1110 (FIG. 11), the application of step 1014 will include first considering fault domain 1130. Because an instance of component "F" is to be allocated, fault domain 1130 is not available because it already includes an "F" instance. This is also true as to fault domain 1132.

But fault domain 1134 does not include an instance of the "F" component. This being the case, processing advances to a step 1016, in which a specific computing device of the available fault domain is determined to be available. In one embodiment, this happens by considering each computing device in the identified available fault domain until a specific computing device is identified that (1) is not hosting an instance of any program component, and that (2) is not a member of an update domain that is hosting an instance of the given program component. Thus, with continuing reference to attempting to identify an available computing device upon which to allocate another instance of "F," cell 1140 is first considered. But cell 1140 includes an instance of another component. Thus, computing device 1142 is considered. But it is a member of an update domain 1144 that already includes an instance of "F." Thus, computing device 1146 is considered, and found to be available because it is a member of the available fault domain, and is also a member of an update domain that does not include another "F" instance.

Accordingly, an identified available computing device is determined at step 1018 (here computing device 1146). At a step 1020, data-center controller 216 assigns the component to computing device 1146 such that it begins hosting an instance of the service component.

To further illustrate allocating program components, we return to FIG. 11, and consider step 1120, which is to allocate a new instance of "B." Fault domain 1150 is considered, but it already includes a "B" instance. Next, fault domain 1152 is considered, and deemed available because it does not include a "B" instance (the hashed "B" is the "B" instance that is being added). Having defined an available fault domain 1152, each computing device in that fault domain is considered. The first available computing device in fault domain 1152 is a member of an update domain 1154 that already includes a "B" instance. The next available computing device is already hosting an "F" instance. The next potential computing device is a member of an update domain 1156 that already includes a "B" instance. Finally, computing device 1158 is deemed available because it is not a member of another update domain that includes another "B" instance and is also not hosting any other component of the service.

A final illustrative example in connection with grid 1116 in which computing device 1160 receives an "I" instance based on the aforementioned rules.

Figure 12:
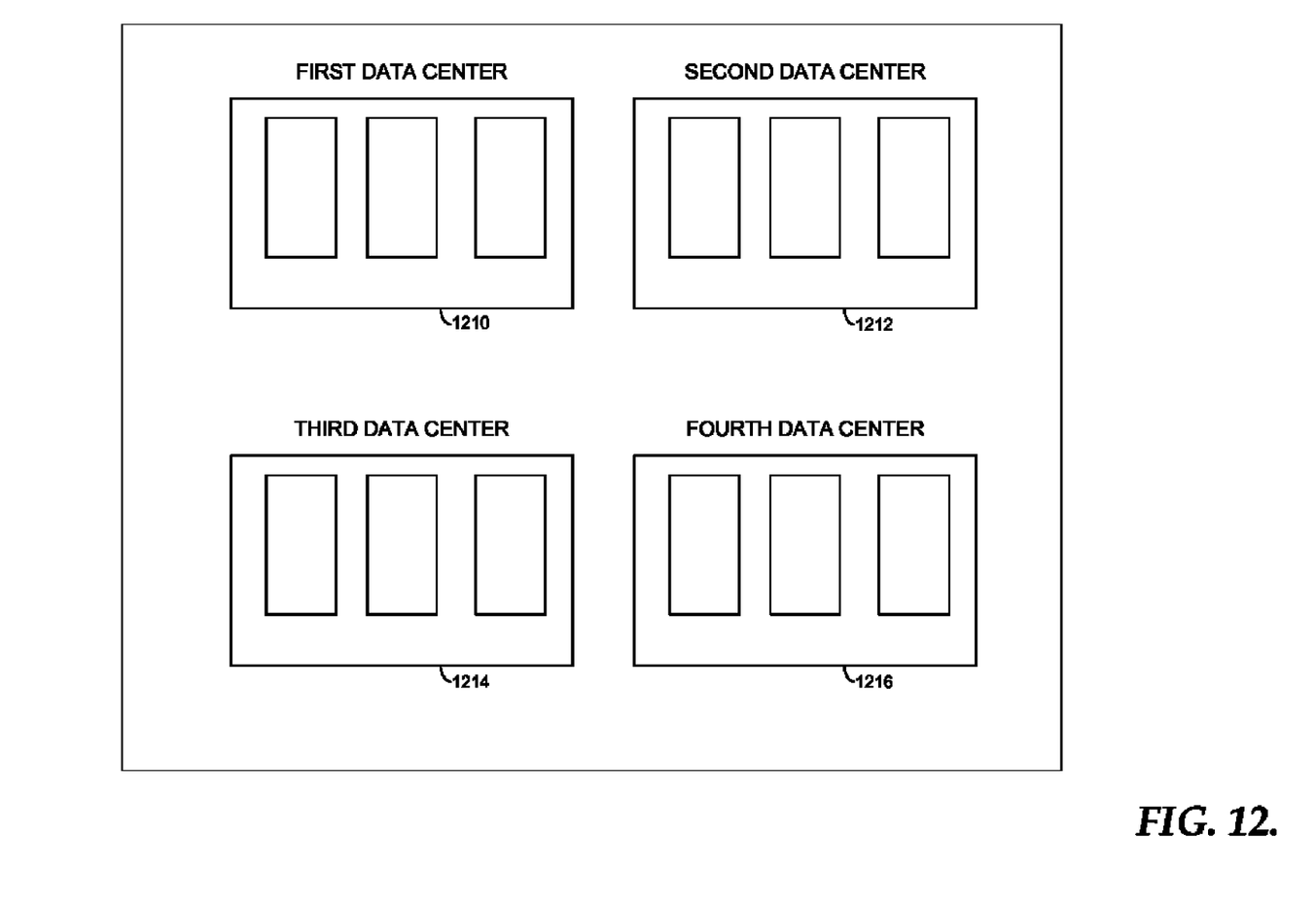
FIG. 12 illustrates that data centers themselves can be points of failure.
Figure 13:
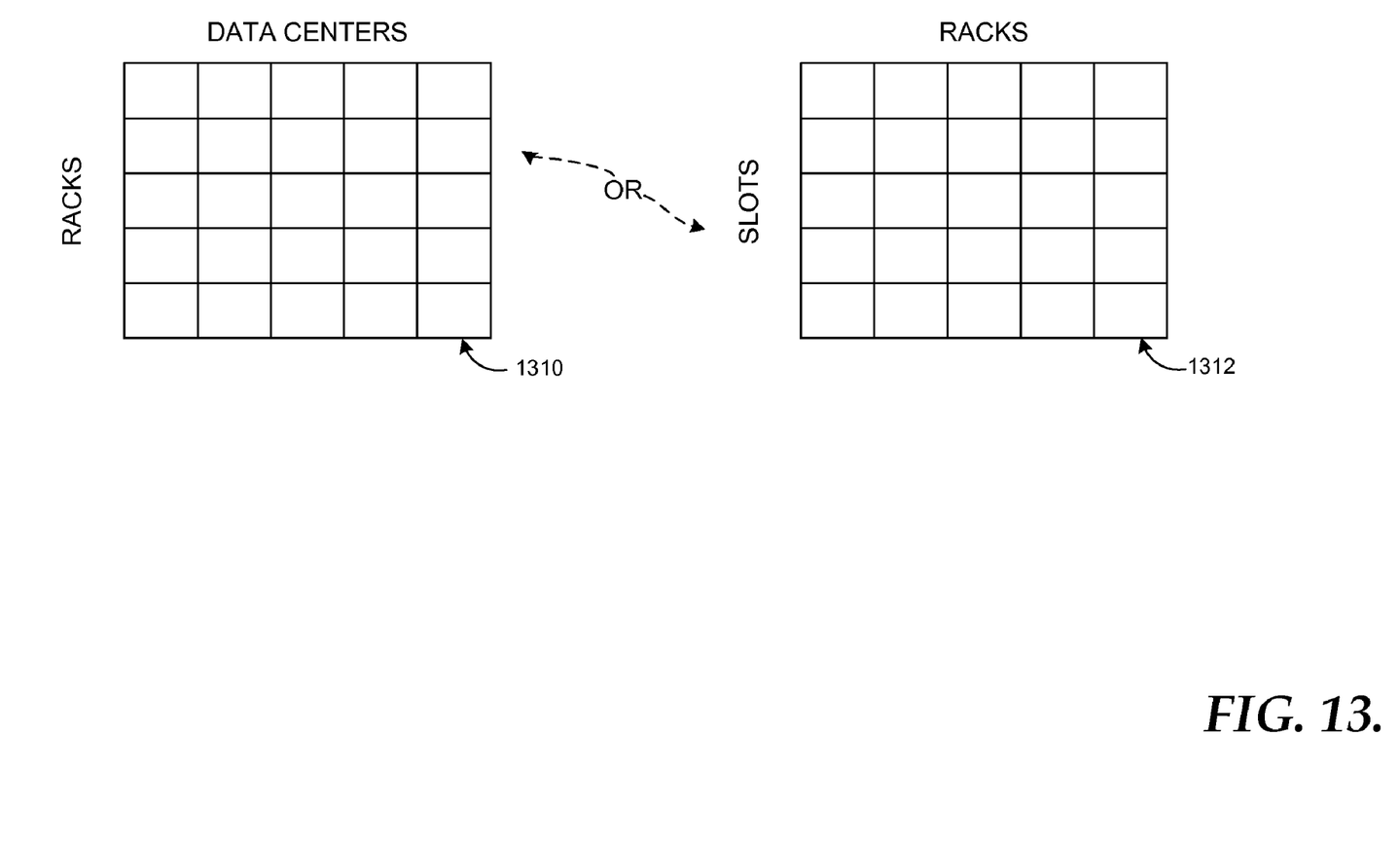
FIG. 13 indicates representations of data centers as points of failure and racks being upgrade domains.

Embodiments of our invention can also be applied to determine data-center allocations in cases where a data center is deemed to be a point of failure. For example, consider FIG. 12, which depicts a first data center 1210, a second data center 1212, a third data center 1214, and a fourth data center 1216. Each data center is shown as illustratively including a number of racks. As mentioned, each data center might be considered a fault domain wherein each rack might be considered an update domain. We illustratively show this in FIG. 13 by way of grid 1310, which illustratively shows data centers as columns and racks as rows. This is akin to grid 1312, which shows racks as columns that indicate fault domains, and rows as slots that indicate update domains.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A computer implemented method when executed by a data-center controller, perform a method of enhancing a likelihood that an application will be remotely available by allocating a plurality of instances of a service across a plurality of domains, wherein a service provides functionality offered by the application, and a domain includes a logical grouping of computing devices, the method comprising:

identifying a set of fault domains, each of which includes a given set of computing devices that are commonly subject to a given point of failure such that if the given point of failure entered into a fail state then the given set of computing devices would fail to function, and identifying a set of update domains, each of which includes a specific set of computing devices that are unavailable while they are being subjected to an update process;

considering each fault domain in the set of fault domains until a given fault domain is identified that does not include any computing device that is running an instance of the service; thereby determining an identified available fault domain;

considering each computing device in the identified available fault domain until a specific computing device is identified that is not a member of an update domain that is hosting an instance of the service, thereby determining an available computing device that is available to host the instance of the service;

by way of the data-center controller, assigning the instance of the service to the available computing device such that the available computing device begins hosting the instance of the service;

wherein the application is made up of multiple program components;

wherein considering each fault domain in the set of fault domains includes considering until a given fault domain is identified that does not include any computing device that is running an instance of a given program component;

wherein considering each computing device in the identified available fault domain includes considering until a specific computing device is identified that,
(1) is not hosting an instance of any program component, and that
(2) is not a member of an update domain that is hosting an instance of the given program component, wherein assigning the instance of the service to the available computing device includes equipping the available computing device with an ability to provide the functionality offered by the application.

2. The computer implemented method of claim 1, wherein the data-center controller is a computing device that manages aspects of computing devices that make up a data center.

3. The computer implemented method of claim 2, wherein at least one computing device in a certain fault domain is also in a certain update domain.

4. The computer implemented method of claim 2, wherein one or more fault domains of the set of fault domains includes one or more of the following:
   a first set of computing devices whose data flow is controlled by a common network switch; and
   a second set of computing devices that are powered by a common source of power.

5. The computer implemented method of claim 4, wherein the update process includes one or more of the following:
   a software-modification process; and
   a hardware-modification process.

6. The computer implemented method of claim 5, wherein the step of considering each fault domain in the set of fault domains includes referencing a first fault domain in the set of fault domains.

7. The computer implemented method of claim 5, wherein the step of considering each computing device in the identified available fault domain includes referencing a first computing device in the identified fault domain.

8. A non-transitory computer-readable media having computer-executable instructions embodied thereon that, when executed by a data-center controller, perform a method of enhancing a likelihood that an application will be remotely available by allocating a plurality of instances of a service across a plurality of domains, wherein a service provides functionality offered by the application, and a domain includes a logical grouping of computing devices, the method comprising:
   identifying a first set of computer groupings that form a portion of the data center, wherein each computer grouping in the first set includes a given set of computing devices that will, from time to time, be commonly unavailable;
   identifying a second set of computer groupings that form a portion of the data center, wherein each computer grouping in the second set includes a specific set of computing devices that will, from time to time, be commonly unavailable;
   considering each computer grouping in the first set until a given computer grouping is identified that does not include any computing device that is running an instance of the service; thereby identifying an available computer grouping among the first set of computer groupings;
   considering each computing device in the available computer grouping until a specific computing device is identified that is not a member of a computer grouping of the second set of computer groupings that is hosting an instance of the service, thereby determining an available computing device that is available to host the instance of the service; and
   by way of the data-center controller, assigning the instance of the service to the available computing device such that the available computing device begins hosting the instance of the service;
   wherein assigning the instance of the service to the available computing device includes equipping the available computing device with an ability to provide the functionality offered by the application.

9. The media of claim 8, wherein a reason that any of the computing devices might become commonly unavailable includes one or more of the following, in connection with the any of the computing devices:
   because of a software modification;
   because of a hardware modification;
   because of a loss of power; and
   because of an intentional act by an administrator.

10. The media of claim 9, wherein considering each computer grouping in the first set includes referencing an arbitrary computer grouping in the first set, and starting the considering with the arbitrary computer grouping.

11. The media of claim 9, wherein considering each computing device in the available computer grouping includes referencing an arbitrary computing device in the available computer grouping, and starting the considering with the arbitrary computing device.

12. The media of claim 9, wherein considering each computer grouping in the first set includes referencing a deliberately selected computer grouping in the first set, and starting the considering with the deliberately chosen computer grouping.

13. The media of claim 9, wherein considering each computing device in the available computer grouping includes referencing a deliberately chosen computing device in the available computer grouping, and starting the considering with the deliberately chosen computing device.

14. A non-transitory computer-readable media having computer-executable instructions embodied thereon that, when executed by a data-center controller, perform a method of enhancing a likelihood that an application will be remotely available by allocating a plurality of instances of a service across a plurality of domains, wherein a service includes a collection of program components that make up an instance of the application, and a domain includes a logical grouping of computing devices, the method comprising:
   identifying a set of fault domains, each of which includes a given set of computing devices that are commonly subject to a given point of failure such that if the given point of failure entered into a fail state then the given set of computing devices would fail to function, and
   identifying a set of update domains, each of which includes a specific set of computing devices that are unavailable while they are being subjected to an update process;
   considering each fault domain in the set of fault domains until a given fault domain is identified that does not include any computing device that is running an instance of a given program component; thereby determining an identified available fault domain;
   considering each computing device in the identified available fault domain until a specific computing device is identified that,
   (1) is not hosting an instance of any program component, and that
   (2) is not a member of an update domain that is hosting an instance of the given program component,
   thereby identifying an available computing device;
   by way of the data-center controller, assigning to the available computing device the instance of the given component such that the available computing device begins hosting the instance of the program component;
   wherein assigning the instance of the component to the available computing device includes equipping the available computing device with an ability to provide the functionality offered by the component.

15. The media of claim 14, wherein each update domain in the set of update domains includes computing devices that have been allocated to the each update domain by a selection process.

16. The media of claim 15, wherein the selection process is automatically carried out by the data-center controller.

* * * * *